United States Patent
Mitchell et al.

(10) Patent No.: US 10,852,152 B2
(45) Date of Patent: Dec. 1, 2020

(54) SYSTEM AND METHOD FOR DERIVING OPERATION INFORMATION OF A FLEET AND ANALYZING THE SAME

(71) Applicant: VERIZON CONNECT IRELAND LIMITED, Dublin (IE)

(72) Inventors: Peter Mitchell, Ranelagh (IE); Samuele Salti, Prato (IT); Francesco Sambo, Padua (IT); Leonardo Taccari, Florence (IT); Luca Bravi, Scandicci (IT); Alessandro Lori, Florence (IT); Andrew Harbourne-Thomas, Foxrock (IE)

(73) Assignee: VERIZON CONNECT IRELAND LIMITED, Dublin (IE)

(*) Notice: Subject to any disclaimer, the term of this patent is extended or adjusted under 35 U.S.C. 154(b) by 0 days.

(21) Appl. No.: 15/549,537

(22) PCT Filed: Dec. 2, 2016

(86) PCT No.: PCT/EP2016/079662
§ 371 (c)(1),
(2) Date: Aug. 8, 2017

(87) PCT Pub. No.: WO2018/099578
PCT Pub. Date: Jun. 7, 2018

(65) Prior Publication Data
US 2019/0285426 A1    Sep. 19, 2019

(51) Int. Cl.
*G01C 21/34* (2006.01)
*G06F 16/28* (2019.01)
*G06F 16/29* (2019.01)
*G06Q 10/04* (2012.01)
*G06Q 40/00* (2012.01)
*G06Q 10/00* (2012.01)

(52) U.S. Cl.
CPC ....... *G01C 21/3484* (2013.01); *G01C 21/343* (2013.01); *G01C 21/3446* (2013.01); *G06F 16/285* (2019.01); *G06F 16/29* (2019.01); *G06Q 10/00* (2013.01); *G06Q 10/047* (2013.01); *G06Q 40/12* (2013.12)

(58) Field of Classification Search
CPC .... G06Q 10/047; G06Q 50/28; G05D 1/0027; G05D 1/0287; G06F 16/29; G07C 5/02
See application file for complete search history.

(56) References Cited

U.S. PATENT DOCUMENTS 9,230,232 B2 * 1/2016 McCormick ........... G07C 5/008
2010/0205022 A1 * 8/2010 Brown ................. G06Q 10/063
705/7.11

(Continued)

OTHER PUBLICATIONS

Cortes et al., "Support-Vector Networks", Machine Learning, 20, pp. 273-297, 1995.
Brieman, "Random Forests", Machine Learning, 45, pp. 5-32, 2001.

*Primary Examiner* — Peter D Nolan
*Assistant Examiner* — Ce Li Li

(57) ABSTRACT

A system and method for optimizing traveled routes of a fleet. The method comprises reconstructing routes traveled by vehicles of the fleet based on historical GPS traces of the fleet; determining stops made by the vehicles along the traveled routes; and classifying the stops into work stops and non-work stops; and optimizing routes for the work stops.

20 Claims, 10 Drawing Sheets

(56) References Cited

U.S. PATENT DOCUMENTS

| | | | |
|---|---|---|---|
| 2013/0096815 A1* | 4/2013 | Mason | G08G 1/20 701/400 |
| 2013/0211660 A1* | 8/2013 | Mitchell | G06Q 10/0639 701/29.3 |
| 2013/0339098 A1* | 12/2013 | Looman | G06Q 10/047 705/7.36 |
| 2013/0339266 A1* | 12/2013 | Looman | G06Q 10/08 705/338 |
| 2015/0077276 A1* | 3/2015 | Mitchell | G06Q 10/083 340/995.1 |
| 2015/0081162 A1* | 3/2015 | Mitchell | G08G 1/0129 701/32.4 |
| 2015/0081212 A1* | 3/2015 | Mitchell | G01C 21/367 701/454 |
| 2015/0081399 A1* | 3/2015 | Mitchell | G08G 1/0129 705/7.38 |
| 2015/0161827 A1* | 6/2015 | Getchius | G08G 1/20 701/519 |
| 2019/0347513 A1* | 11/2019 | Salti | G06K 9/6217 |

\* cited by examiner

SYSTEM AND METHOD FOR DERIVING OPERATION INFORMATION OF A FLEET AND ANALYZING THE SAME

RELATED APPLICATION

This application claims priority to PCT Application No. PCT/EP2016/079662, filed Dec. 2, 2016, which is incorporated herein by reference.

FIELD OF THE INVENTION

The present application generally relates to a system and method for deriving operation information of a fleet and analyzing the derived information for improving the operation of the fleet. More specifically, the system and method are capable of deriving past stops and routes traveled by the fleet based on historical GPS traces with minimum input from the owner of the fleet, determining improvements of route planning by the adoption of a routing algorithm, and selecting fleets that may be benefited from the routing algorithm.

BACKGROUND

Vehicle fleets are used for daily operations in a wide range of industries, such as parcel delivery, healthcare, human transportation, emergency response, field construction, HVAC maintenance, oil and gas, etc. These vehicle fleets represent the most important asset to companies which rely on them to deliver reliable, on time, and cost-effective services to customers. To manage these vehicle fleets, a great deal of expertise is required in the area of scheduling order, planning travel routes, assigning vehicles and drivers, tracking vehicles while in transit, maintaining vehicles, and complying with regulatory requirements. Very often, the company that operates a fleet of vehicles in its daily business uses support and assistance from fleet service specialists or companies, such as Fleetmatics™, which, among many other services, provide a fleet management software to their customers to help them schedule orders and plan routes and provide real time vehicle tracking and navigation services. In addition, the fleet service companies keep developing specialized fleet management features which are designed to provide improved operation performance of fleets that serve certain industries or have certain travel patterns.

Among functions of a fleet management software, finding optimal routes for the fleet to fulfill its service demands has direct impact on the revenue and profits of a company. The routing algorithm will dictate delivery schedule, vehicle assignment, driver assignment, fuel consumption, vehicle maintenance, and regulatory compliance. An effective route planning algorithm needs to consider many factors, such as fleet size, available drivers, coverage areas, traffic conditions, work order requirements, tolls along routes, and safety of drivers, in the process of optimizing travel routes. It is very difficult to provide a one-size-for-all routing solution for all different fleets. Generally speaking, a routing algorithm is designed based on certain specific assumptions of the fleet. When a fleet is operated outside of these assumptions, that routing algorithm becomes less effective.

As a fleet owner, it is desirable to use fleet management software, such as a routing algorithm, that best fits the characteristics of his or her fleet. Without any guidance, a fleet owner would have no knowledge about how to select fleet management software. And, many times, a fleet owner, who has not used a routing algorithm for his or her fleets, relies rather on domain knowledge and personal expertise to manually plan his or her routes, or is using routing software that does not fit his or her needs. Manual planning is only practical for very small fleets, and it is not flexible. Even if manual planning or a simple routing algorithm has been adopted for a small fleet, the fleet may be expanded later with more vehicles to a larger service area or to serve another industry. This expansion may increase the number of vehicles, drivers or orders, or the operational constraints (such as delivery time windows) might become more complex. When the routing problem grows too complicated, manual planning requires much time and effort, or the existing routing algorithm could become outdated, and the resulting routes can be very far from optimal. In this case, or when the used routing software is ill-suited for the task at hand, the fleet company or the fleet owner will waste many resources on a regular basis, which can be easily saved by adopting a better fleet routing software. Even though a new fleet management feature may only save a small amount of benefits for a company, these limited improvements of a fleet are still worth pursuing because the accumulation over time could create a substantial advantage over competitors.

Thus, there is a need for timely providing, to a fleet owner, fleet management software that produces an improved operation of the fleet over an existing software. But, to have a fleet owner adopt a better routing service is not a straightforward task. Even after a new routing algorithm is available for a while, a fleet owner may not be aware of it at all as his or her main attention is focused on running the business, not on finding the best software for the business. The fleet owner may also be reluctant to replace a seemingly working routing service without any concrete proof of benefits that can be demonstrated by a new routing service. One possible way to demonstrate the improvement of the new routing service is to ask the fleet owner to provide historical routes of the fleet, and then the fleet service provider can apply a new routing algorithm to the historical routes and show the improvement by the new algorithm. This is undesirable to a fleet owner because the fleet owner may need to spend a lot of time in collecting the historical data, selecting the relevant data and providing the additional information required by the routing service (such as, for example, the administrative office of a fleet, the warehouses, all the work stops, homes, and work shifts), or because the fleet owner simply does not keep all the relevant data.

SUMMARY OF THE INVENTION

Therefore, it is a challenging task for a fleet service company to determine the potential improvements of a fleet by the adoption of a new fleet management feature, without requesting the historical data and the additional information required by the fleet management feature from the owner of the fleet. This obstacle makes it difficult for the fleet service company to timely develop and deliver a new fleet management feature to a suitable customer. The system and method as set forth in the present application solve this problem by deriving operation information of a fleet from data sources that are independent from the fleet owner. Thus, the input from the fleet owner is not required for the fleet service company to infer operation information of that fleet. Examples of the independent data sources include GPS traces of a fleet, GIS databases of a third party, or other location-based information whose accessibility does not require the involvement of a fleet owner. The GPS traces, also known as GPS tracks, are routinely stored in databases external to those of the fleet owner. For example, a fleet service provider, such as Fleetmatics, may store the GPS traces of vehicles to which the GPS service provider has provided tracking and navigation service. In another example, a GPS service provider may store GPS traces of vehicles in its own database.

The derived operation information is capable of showing important operation features of a fleet. For example, the derived operation information may show the administrative office of a fleet, the warehouses, all the work stops, homes, and work shifts. This information may provide back ground information when the development of a fleet management feature is planned. These information is also used as the basis in determining the improvement of the fleet operation by adopting the new fleet management feature.

For example, the system and method as disclosed in the present application relies on the GPS traces and other publicly-available information to derive or infer historical routes of a fleet and information related to them, such as working hours, paths, stops, depots, homes, etc. Based on the derived operation information of a fleet, a new routing algorithm is tested to determine the improvement of the newly planned routes over the actual traveled routes. When the improvement is greater than a predetermined threshold, the fleet is identified and is contacted to introduce the new routing algorithm.

An aspect of the present application is directed to a method for optimizing traveled routes of a fleet. The method comprises reconstructing routes traveled by vehicles of the fleet based on historical GPS traces of the fleet; determining stops made by the vehicles along the traveled routes; and classifying the stops into work stops and non-work stops; and optimizing routes for the work stops.

According to an embodiment of the present application, the method further comprises determining hotspots from the stops, a hotspot representing a recurrent stop made by vehicles of the fleet;

According to various embodiments, the method further comprises determining depots from the hotspots, a depot representing an administrative office or a warehouse of the fleet, determining work hours of the fleet based on the historical GPS traces, obtaining point-of-interests information from a 3rd party database, classifying a stop based on the historical GPS traces and the point-of-interests information, analyzing the reconstructed route to determine whether the fleet is benefited from adopting a fleet management function, selecting a plurality of fleets that will be benefited from adopting the fleet management function, and/or preparing individualized market materials that include results obtained by the analyzing step, and/or determining a return of investment for the fleet that is generated by an adoption of the routing algorithm, the return of investment being determined based on the optimized routes According to one embodiment, the fleet management function is a routing algorithm.

According to various embodiments, the method does not require descriptive information about the routes traveled by the vehicles of the fleet to be provided by an owner of the fleet.

According to another aspect of the present application, the disclosed method is implemented as an executable program stored on a non-transitory storage medium. The executable program may be executed by a processor that executes the method.

BRIEF DESCRIPTION OF THE DRAWINGS

The accompanying drawings are provided to illustrate embodiments of this disclosure, and, together with the detailed description, serve to explain principles of embodiments as set forth in the present application, in which.

DETAILED DESCRIPTION

It will be appreciated by those ordinarily skilled in the art that the foregoing brief description and the following detailed description are exemplary (i.e., illustrative) and explanatory of the subject matter as set forth in the present application, but are not intended to be restrictive thereof or limiting of the advantages that can be achieved by the present application in various implementations. Additionally, it is understood that this detailed description is representative of some embodiments as set forth in the present application, and are neither representative nor inclusive of all subject matter and embodiments within the scope as set forth in the present application.

Figure 1:
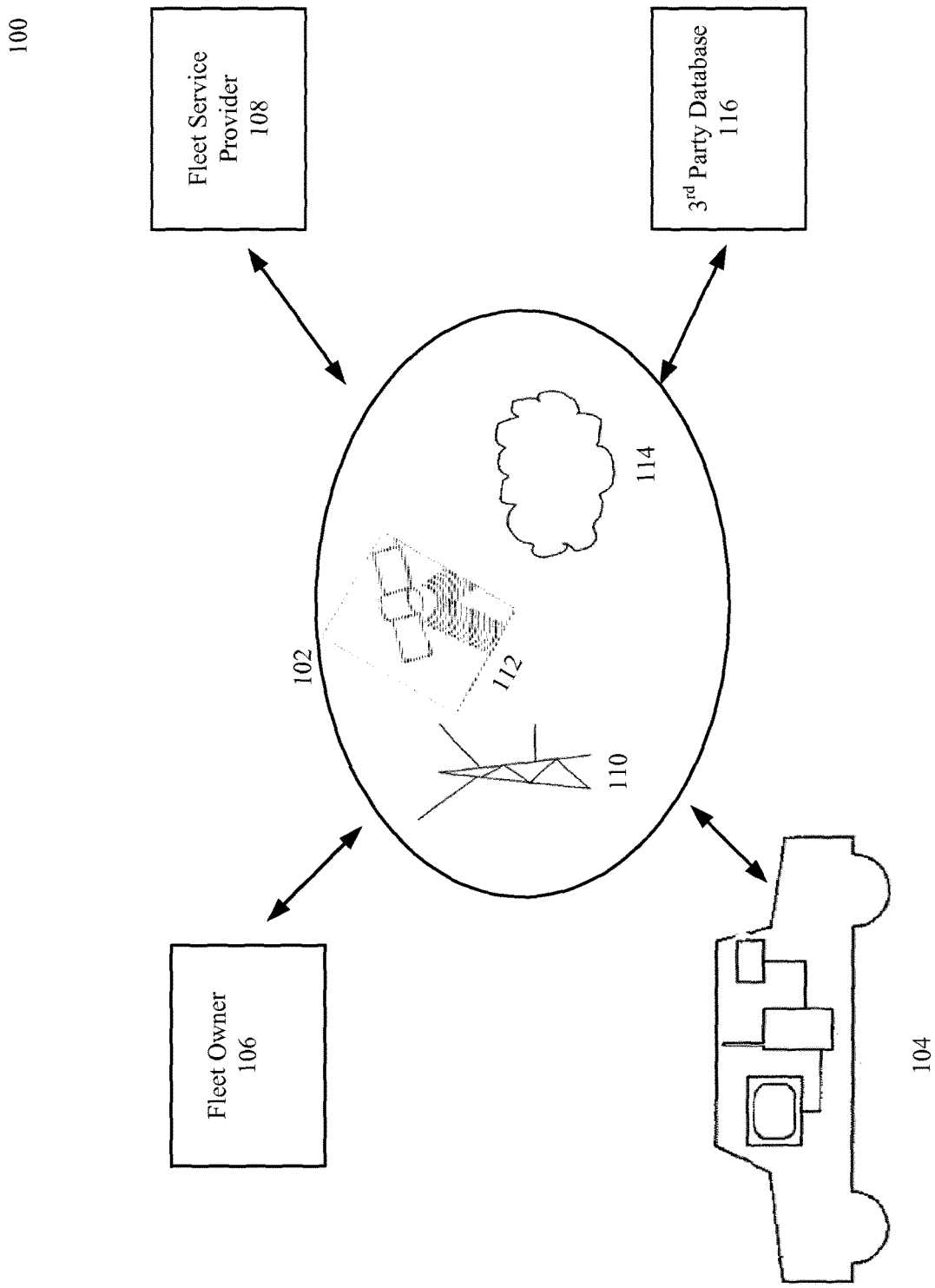
FIG. 1 illustrates a fleet service system according to an embodiment of the present application.

FIG. 1 illustrates a fleet service system for a fleet of vehicles according to an embodiment of the present application. The fleet service system 100 includes a fleet of vehicles 104 that belong to a fleet company or owner 106, a fleet service provider 108, and a $3^{rd}$ party database 116. To manage the fleet 104 efficiently, the fleet owner 106 relies on services provided by the fleet service provider 108, such as Fleetmatics, to manage the fleet 104, such as routing planning and vehicle maintenance. The $3^{rd}$ party database 116 may collect and integrate geographical information of an area and make those data available for the public to use. The communication among the fleet owner 106, the fleet 104, the fleet service provider 108, and the $3^{rd}$ party database is implemented via a communication network 102. In one example of the fleet service system 100, the company or fleet owner 106, such as a mid-size HVAC company, uses a fleet of vehicles 104 to transport both equipment and technicians to a job site and relies on mobile applications, such as Fleetmatics Work or Reveal, to schedule, track, and maintain the fleet of vehicles 104. The $3^{rd}$ party database 116 may be a GIS system that is managed by Google, which associates location information, such as coordinates and address, with other real life information, such as business name, distance, map, satellite images, street maps, and etc. It is noted that the fleet of vehicles is not limited to a group of automobiles, but also includes water vessels, aircrafts, trains, and any other transportation means.

In one embodiment, the fleet service provider 108, among other services, may provide a route planning algorithm to the fleet owner 106 that is used to optimize routes to be travelled by the fleet 104 for supporting the business of the company 106. The fleet service provider 108 may also provide navigation services for guiding a vehicle along a planned route to a destination. In one example, a vehicle of the fleet may request a navigation service to one or several destinations while the vehicle is on the road. In another example, the fleet owner may assign work orders to each vehicle and request an optimal route planning for each vehicle. A work order of a vehicle typically has information about the service to be provided, the delivery time, schedule, the destination address, contact information of a customer, charges, warranties, etc. In another example, the fleet owner may request the fleet service provider to plan routes for all vehicles and for all orders to be delivered on a specific day. In this example, the route planning needs to assign vehicles to routes, assign orders to each vehicle, assign drivers to each vehicle, and optimize the route across all assigned vehicles. Yet in another example, the fleet owner 106 may request route planning service for all work orders regardless of delivery time.

The fleet owner 106 and the fleet service provider 108 are independent and separate entities, which will keep their own databases separately from each other and will not routinely share information that is proprietary to each party. The fleet owner 106 has its own database that stores all business related data, including scheduling information, order information, route assignment, driver assignment, vehicle assignment, invoice, insurance, tolls, revenue, profits, compliance with regulations, etc. Depending on the relationship between the fleet owner 106 and the fleet service provider 108, the fleet service provider 108 may store limited information of the fleet owner 106 in its own database. For example, the fleet service provider 108 may have a fleet report that includes general business information of a fleet, the information of the vehicles in the fleet 104, and information of the driver to provide proper service to the fleet. But, the fleet service provider 108 generally does not store information about work orders, which have detailed description of a specific service to be provided by the fleet.

When a routing service of the fleet service provider 108 is used by the fleet owner 106, optimal routes that cover a plurality of work orders may be planned offline. Sometime, the optimal routes may be planned in real-time when additional stops need to be made. While in transit, the vehicle is guided by a plurality of satellites 112, which track the vehicle in real-time and on a regular basis. In some situations, the GPS tracks or traces are recorded and transmitted to the fleet service provider 108. In some situations, the GPS tracks or traces may be stored by the fleet owner or the company who operates the plurality of satellites. Regardless in which database the GPS traces are stored, these GPS traces may be available to a fleet service company to explore. The GPS traces of the vehicle are formed by a sequence of GPS records, each of which consists essentially of vehicle identification information, time stamp, longitude of the vehicle, and latitude of the vehicle. Very little other data, such as altitude, speed, and acceleration of the vehicle, may be optionally determined by the plurality of satellites 112 and included in the GPS traces. The sampling rate of the GPS traces may be set to a fixed interval or may vary depending on vehicle moving conditions. These GPS traces or tracks are known to a person of ordinary skill in the art to represent raw GPS data without any other description information about the route or the vehicle or any other object. Both the fleet owner 106 and the fleet service provider 108 store these GPS traces in their own databases.

In one embodiment, other information about the vehicle may be collected by the fleet service provider 108. The fleet owner 106 may request the fleet service provider 108 to provide services for vehicle maintenance. The fleet service provider 108 may install a transmitting device on a vehicle of the fleet 104 to read event codes collected by vehicle's on-board computer and transmit these codes to the fleet service provider 108. The codes may reveal information about engine events and mileage, and may be known, for example, as OBD or OBDII codes. When the codes are available to the fleet service provider 108, they may be used to determine the running status of the vehicle, including engine on, engine off, speed, acceleration, and etc.

According to an embodiment, the fleet service provider 108 develops a plurality of routing algorithms that are suitable for finding optimal routes in various circumstances. An optimal route represents a set of shortest paths or the least cost path based on predetermined performance goals. The term "shortest path" or "least cost path" is not limited to the shortest distance, but also includes the concepts of minimal time, the least amount of fuel consumption, the least amount of emission, or other performance metrics, and the combination thereof. In one embodiment, all routing algorithms are capable of providing routing planning for one vehicle that is going to make a series of stop in one day. But, each routing algorithm can produce a better result than others when it is used to plan routes with a specific pattern. For a more complicated routing service, a routing algorithm may optimize routes for one vehicle spanning the period of multiple days. For an even more complicated routing service, a routing algorithm may optimize routes for all the vehicles in the fleet spanning the period of multiple days and based on one criterion. Some routing services could optimize the routes for the entire fleet spanning the period of several days and based on multiple performance goals. The fleet owner would need subscriptions to different levels of routing services to use these services. To have the best optimization result, the operation of the fleet needs to switch to another routing algorithm when the route pattern is changed.

The communication network 102 should be broadly construed to include any one or more of a number of types of networks that may be created between devices using an internet connection, a LAN/WAN connection, a telephone connection, a wireless connection, a short message system (SMS), a satellite connection, and so forth. According to an embodiment, the communication network 102 includes at least a cellular network 110, a satellite network 112, and a computer network 114, such as the Internet. The computer network 114 may comprise various configurations and protocols including the internet, World Wide Web, intranets, virtual private networks, wide area networks, local networks, private networks using communication protocols proprietary to one or more companies, Ethernet, WiFi and HTTP, cloud and cloud based services, and various combinations of the foregoing. Such communication may be facilitated by any device capable of transmitting data to and from other computers, such as modems (e.g., dial-up, cable or fiber optic) and wireless interfaces.

The $3^{rd}$ party database 116 represents an information provider other than the fleet owner 106 or the fleet service provider 108 that makes location-based information available for general public. For example, Google provides map services and information about point of interests to other parties. The 3$^{rd}$ party database 116 associates position information, such as global coordinates, with map data and point of interests information, such as business name, address, landmark, and other information about a location. In one example, third party data include information about the location of shops, schools, service stations, restaurants, hotels and any other relevant place. In another example, third party data include historical traffic data, meteorological data, service station lists, and current and historical fuel price of a service station.

Figure 2:
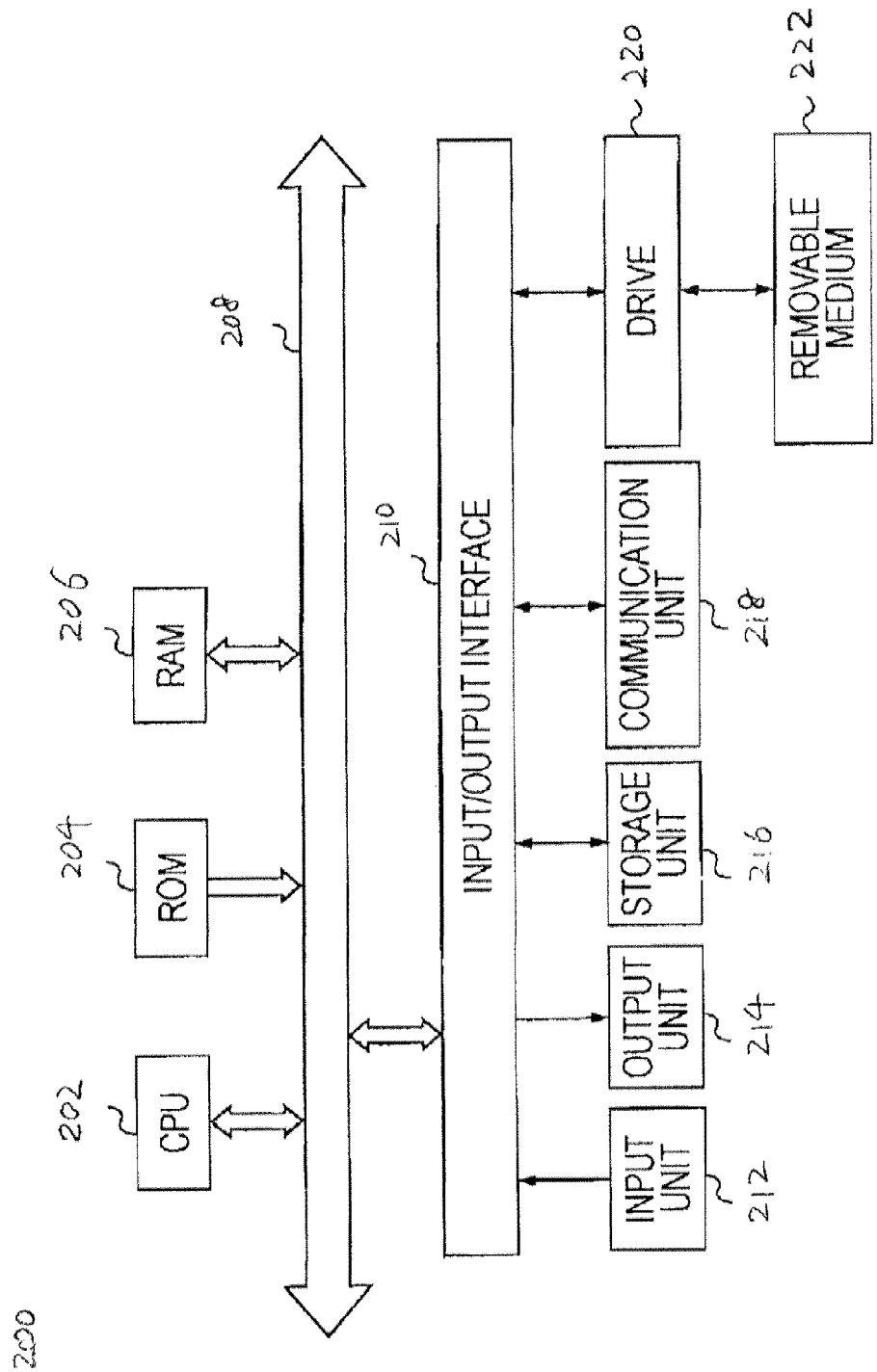
FIG. 2 illustrates a general structure of a computing device according to an embodiment of the present application.

FIG. 2 illustrates a general structure of an electronic computing device that may be used by the fleet owner 106 and the fleet service provider 108 for communication, management, computing, information storage, and data processing. The exemplary structure 200 includes a CPU 202, a ROM 204, a RAM 206, a bus 208, an input/output interface 210, an input unit 212, an output unit 214, a storage unit 216, a communication unit 218, and a drive 220. The CPU 202, the ROM 204, and the RAM 206 are interconnected to one another via the bus 208, and the input/output interface 210 is also connected to the bus 208. In addition to the bus 208, the input unit 212, the output unit 214, the storage unit 216, the communication unit 218, and the drive 220 are connected to the input/output interface 210.

The CPU 202 executes various kinds of processing in accordance with a program stored in the ROM 204 or in accordance with a program loaded into the RAM 206 from the storage unit 216 via the input/output interface 210 and the bus 208. The ROM 204 has stored therein a program to be executed by the CPU 202. The RAM 206 stores as appropriate a program to be executed by the CPU 202, and data necessary for the CPU 202 to execute various kinds of processing. The CPU 202 may include multiple processors such as ASICs, FPGAs, GPUs, etc. A program may include any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The input unit 212 includes a keyboard, a mouse, a microphone, a touch screen, and the like. When the input unit 212 is operated by the user, the input unit 212 supplies an input signal based on the operation to the CPU 202 via the input/output interface 210 and the bus 208. The output unit 214 includes a display, such as an LCD, or a touch screen or a speaker, and the like. The storage unit 216 includes a hard disk, a flash memory, and the like, and stores a program executed by the CPU 202, data transmitted to the terminal 200 via a network, and the like.

The communication unit 218 includes a modem, a terminal adaptor, and other communication interfaces, and performs a communication process via the networks of FIG. 1.

A non-transitory storage medium 222, sometimes removable, may be formed of a magnetic disk, an optical disc, a magneto-optical disc, flash or EEPROM, SDSC (standard-capacity) card (SD card), or a semiconductor memory. The medium 222 is loaded as appropriate into the drive 220. The drive 220 reads data recorded on the medium 222 or records predetermined data on the removable medium 222.

An operating system such as Microsoft Windows 7®, Windows XP® or Vista™, Linux®, Mac OS®, or Unix® may be used by the device 200. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified in accordance with the instructions. For instance, although the system and method is not limited by any particular data structure, the data may be stored in computer registers, in a relational database as a table having a plurality of different fields and records, XML documents, flat files, etc. The data may also be formatted in any computer-readable format such as, but not limited to, binary values, ASCII or Unicode. The textual data might also be compressed, encrypted, or both. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

According to an embodiment of the present application, the system, method, algorithm, step, and process as disclosed in the present application may be implemented as hardware, software, or both. When the algorithm and process are implemented as software, such as an executable program, the algorithm and process are stored in the medium 222. The general structure as shown in FIG. 2 needs to be specifically configured to process the algorithm and process as disclosed in the present application. For example, the programs need to be installed in the device 200 and registered in the operation system. Thus, those individual instructions included in the programs transfer the exemplary structure from a general computer to a special designed device to execute the algorithm and process as disclosed in the present application.

Figure 3:
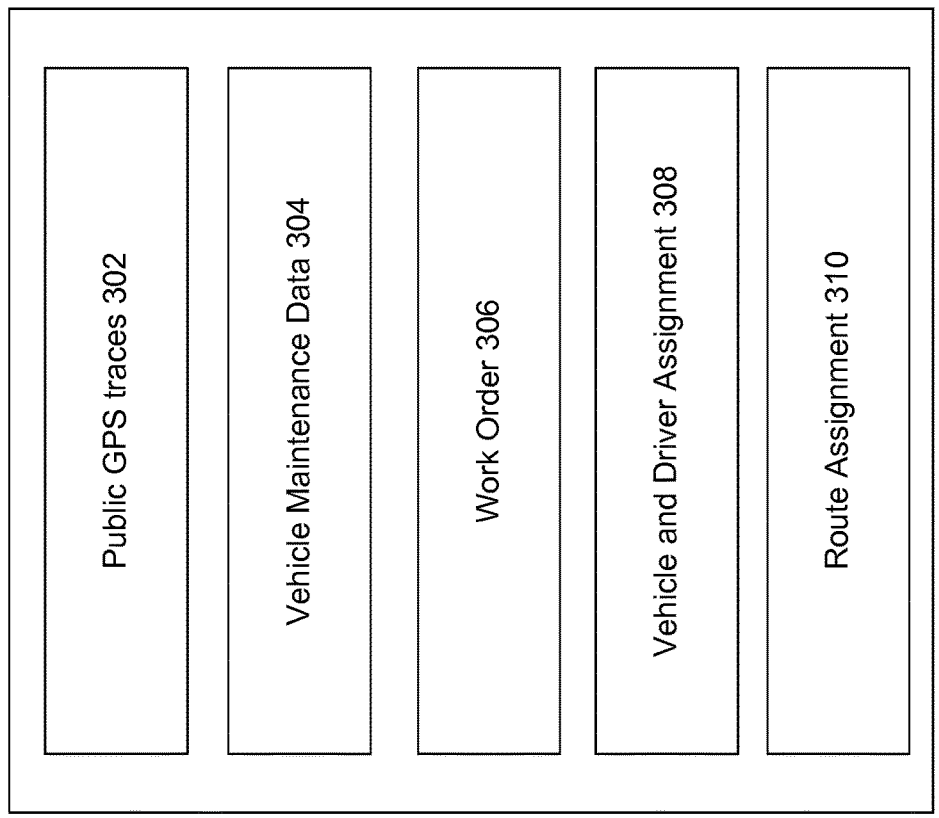
FIG. 3 illustrates exemplary operation information of a fleet according to an embodiment of the present application.

FIG. 3 shows exemplary data related to the operation of a fleet according to an embodiment of the present application. The fleet operation data 300 may be understood to have comprehensive information about all aspects of the fleet. The method and system of the present application use only a subset of those fleet operation data to derive fleet operation characteristics and do not rely on the full comprehensive operation data. As an example, three categories of data are shown in FIG. 3: GPS traces 302, vehicle maintenance data 304, work order 306, vehicle and driver assignment 308, and route assignment 310. The GPS traces 302 mainly include the coordinates of a position of the vehicle and a vehicle ID. The GPS traces may optionally include speed information of the vehicle. No other information that describes points of interests of that position is included in the GPS traces. The following table I shows an example of GPS traces.

| Latitude | Longitude | Elevation | Speed |
| --- | --- | --- | --- |
| N42.45365 | W071.52147 | 459.35 ft | 0.7 mph |
| >N42.45312 | W071.52202 | 454.62 ft | 2.3 mph |
| N42.45275 | W071.52284 | 456.19 ft | 0.5 mph |

-continued

| Latitude | Longitude | Elevation | Speed |
|---|---|---|---|
| N42.45209 | W071.52324 | 470.39 ft | 1.7 mph |
| N42.45136 | W071.52279 | 490.89 ft | 0.8 mph |
| N42.45084 | W071.52248 | 506.66 ft | 1.1 mph |

In Table I, the position information, as indicated by latitude and longitude, is collected periodically, such as every second. In addition, elevation and speed of the subject is also included. Without further processing, these GPS traces cannot reveal other useful information related to the service that the vehicle was providing, such as stops, destination, and working hours.

Vehicle maintenance data 304 refers to those data concerning the status of a vehicle, such as vehicle VIN, mileage, engine running hours, major repairs, unusual events of the engine, and etc. In one embodiment, diagnostic codes by vehicle on-board computer may be collected and reported to the routing service provider as vehicle operation data 304. These diagnostic codes may be based on an OBD or OBDII system. The work order 306 has descriptive information about services or orders to be provided by the vehicle in addition to the information about the route that is to be traveled by a vehicle, such as destination address, required delivery time, signature requirement, content of the delivery, in-transit time, previous route of the vehicle, charges or etc. The vehicle and driver assignment data 308 include the assignment of drivers to each vehicle and the working hours of each driver. The route assignment 310 includes the area coverage of a vehicle or a driver. In one embodiment, a fleet owner may have a database that stores all the operation data in FIG. 3. The fleet service provider 108 may commonly store the GPS traces 302 in its own database. The fleet service provider 108 may also store the vehicle maintenance data 304 is its own database. The system and method as set forth in the present application are capable of deriving operation information related to work order 306 based on the GPS traces 302.

Figure 4:
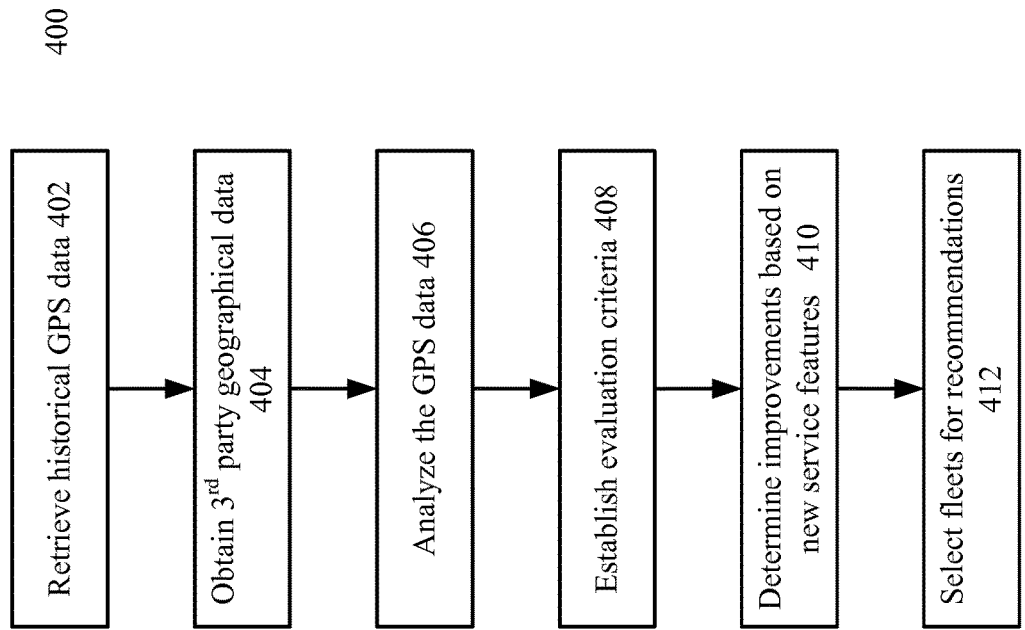
FIG. 4 illustrates a method for identifying fleets that may benefit from a new routing algorithm according to an embodiment of the present application.

FIG. 4 illustrates a method for deriving fleet operation data and analyzing the same to identify fleets that may benefit from adopting a new routing algorithm according to an embodiment of the present application. The method, as shown in FIG. 4, utilizes the GPS traces of vehicles stored in the database of a fleet service provider 108 to derive relevant information about the route patterns of a fleet. The involvement from a fleet owner is reduced to minimum. For example, the fleet owner may be contacted to obtain permission to analyze the data associated with his or her fleet. But, no additional data from the fleet owner is required by this method.

At step 402, the historical GPS traces stored in a fleet service provider's database is retrieved for a fleet. In one embodiment, fleet information, such as vehicle IDs, has been provided by the fleet owner to the fleet service provider 108, which is used by the fleet service provider to retrieve historical GPS traces of all vehicles belongs to a specific fleet. The time period for retrieving the historical GPS traces may be any predetermined value that covers at least one work shift carried by a fleet, such as one day, several days, one week, and several weeks. In one embodiment, the time period to retrieve historical GPS traces may be determined based on the characteristic of the industry that the fleet serves, which requires work shifts of different lengths. For example, for home services, the period may be set to one day. For parcel deliveries, the period may be set to one week. For interstate moving services, the period may set to one month.

At step 404, $3^{rd}$ party geographical data are obtained. The method 400 may first determine a boundary of the areas covered by the historical GPS traces and then request $3^{rd}$ party geographical data based on the identified boundary. Step 404 may search for peak values in the coordinates of the retrieved GPS traces and uses the peak values to define the covered area. In one embodiment, step 404 creates a rectangular box based on the peak values as the covered area. The obtained geographical data of the covered area may include maps, road networks, business information, weather, fuel price, terrain, and etc.

At step 406, the historical GPS traces together with the $3^{rd}$ party data are analyzed to derive relevant information about the operation information, such as route patterns, of the fleet. In one embodiment, a machine learning algorithm, such as decision trees or random forests, is implemented to reconstruct the routes traversed by the fleet, including hotspots, such as depots and employees' homes, the duration of the shifts during the day, stops as work orders and any other information related to route patterns of the fleet. Step 406 will be further described in other parts of this application.

In one embodiment, steps 402-406 may be implemented regularly for all fleets that use the service of the fleet service provider 108. In this way, the route patterns of a fleet may be readily available to the fleet service provider 108 before a new fleet management feature is tested.

At step 408, filtering criteria are established for identifying fleets which may benefit from the adoption of a new fleet service feature, such as a new routing algorithm. The filtering criteria may include those that are used to identified fleets that are unfit for the new fleet management software and those that are used to identified fleets with higher improvements. The first one may be understood as filtering-out criteria and the latter one may be understood as selection criteria. In one example, a selection criterion is Return of Investment (ROI) of a fleet, which represents a quantitative value that embodies comprehensive considerations of many factors, such as travel distance, fuel cost, labor costs, number of vehicles, toll, and emission. In one embodiment, the method and system estimate each factor based on an dollar amount and aggregate all factors as the ROI. In one embodiment, the ROI also considers the subscription fee paid by a fleet owner for the use of a new routing service. One filtering-out criterion is the number of vehicles of a fleet because when the number of vehicles of a fleet or along a route is less than a predetermined threshold, the saving generated by a routing service may be insubstantial comparing with the manual route planning.

At step 410, the rate of improvement on the performance goals is calculated. The new routing algorithm is applied to the reconstructed routes to re-plan the routes. The re-planned routes are compared with the actual routes to find the difference, which is used to calculate the rate of improvement.

At step 412, targeted fleets are selected based on the filtering criteria. In one embodiment, fleets may be first filtered out based on a classification of the fleets. In one embodiment, fleets may be classified based on the fleet dimension, then targeted fleets may be first selected based on the requirement of fleet size of the new routing algorithm. If the new routing algorithm is applicable to a large fleet size, then fleets that are deemed small are first filtered out of the pool of potential targets. In one embodiment, the fleets are separated into two categories: one representing enterprise customers, who own a fleet with several hundreds of vehicles, and the other representing small or medium business customers. Another classification of fleets may be based on the common planning period of the vehicle activity. For example, the activity of a fleet may be planned based on multi-day and single-day of work order services. Yet another classification of fleets may be based on the main business activity, such as parcel delivery, transportation, plumbing, technical services, landscaping, health care, or towing. The classification of fleets can be inferred from stored information about the fleet, such as the company name, meta-data of a fleet, Standard Industry Codes (SIC), or based on the analysis of the daily operations of a fleet or from other publicly available information of the company. In another embodiment, fleets are classified based on the number of depots, which refer to as recurrent stops. A larger fleet sizes are usually related with a higher number of depots spread over a wider territory. A small fleet can have multiple depots with different purposes (for instance administrative offices and warehouses). Depots and their functionalities lead to classify fleets on the basis of their daily activities pattern. For example, vehicles can start and end their activity at the depots, which may not be passed by during the day or be passed by one or several times. A vehicle may start and end the working day at home, or even exhibit any combination of stops at depots, homes, work orders in different orders.

In one embodiment, a routing algorithm is designed for a particular pattern of activity. The fleets are identified and selected based on the pattern of activity of the routing algorithm, and fleets that do not fit to the pattern of activity are determined to be an unsuitable target. For example, a routing algorithm for emergency response service, where typically vehicles go from depots to the requesting site and back to the depots, is not suitable for route planning for parcel deliveries, which require advance planning for consecutive orders.

In one embodiment, step 412 filters out fleets from the pool of potential targets based on reliability of the analysis of the GPS traces and reconstructed routes. For example, when a route pattern, such as depots and the working hours, cannot be reconstructed, that fleet is filtered out from the pool of potential targets. In another example, when either the number of original active vehicles or active vehicles in the optimized solution is less than a predetermined threshold, the fleet is filtered out. In another example, when a fleet has a number of work orders smaller than a given threshold, it is filtered out.

After unqualified fleets are filtered out of the pool of targets, the routing algorithm is applied to the remaining fleets in the pool. After that, the potential ROI over the analyzed period has been estimated. In one example, fleets, whose ROI is greater than a predetermined threshold, are identified for targets that will benefit from the adoption of the new routing algorithm. Personalized marketing material tailored to each fleet may be prepared based on the analysis.

In one embodiment, a machine learning algorithm may be implemented to apply the filtering and selecting rules. In addition to the ROI for selecting target fleets, the following features may be also used for filtering: general statistics (number of vehicles, number of depots, average number of vehicles used per day, etc.), geographical information (states of operation, shape of operation area), operations (operation mode, that is the functionality pattern defined by the recurrence of stops at a depots or at home in a day, route variability among different days, recurrent clients, zoning, percentage of time on highways), sales history (product purchased, timely payments, etc.), and engagement with other company products (on the basis of the current software usage).

Figure 5:
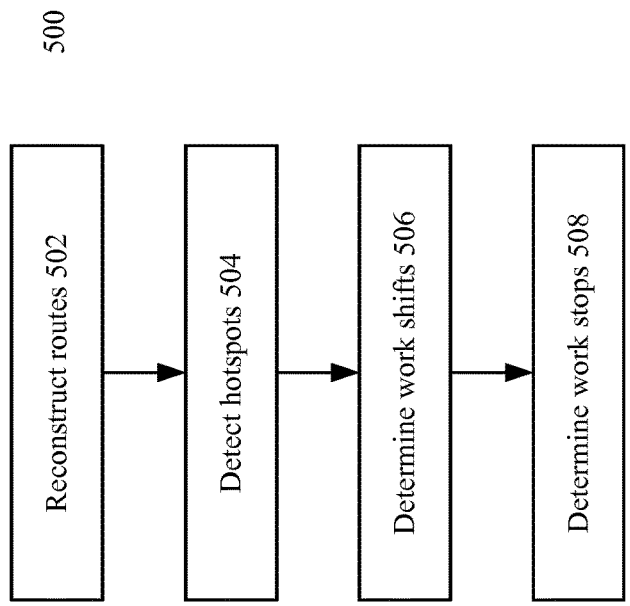
FIG. 5 illustrates a method for deriving operation information of a fleet from a data source that is external to a fleet according to an embodiment of the present application.

FIG. 5 illustrates an algorithm 500 for deriving route patterns of a fleet in step 406 according to an embodiment of the present application. In one embodiment, the method 500 uses machine learning algorithms to analyze the GPS traces, in which a set of examples are first used to train the algorithms, such that the algorithm builds a proper model that fits those examples. After the algorithm is trained, it is used on real GPS traces. The machine learning algorithm may be a supervised, unsupervised, and/or semi supervised algorithm. Typical problems solved by a supervised machine learning algorithm include classification, in which the output value for each data point needs to be one of a finite set of values, and regression, in which the output value could be any numeric value. Popular supervised machine learning algorithm are SVM and random forests, which are described in Cortes, C.; Vapnik, V. (1995). "Support-vector networks", Machine Learning. 20 (3): 273-297. doi:10.1007/BF00994018, and Breiman, L. (2001) "Random Forests", Machine Learning 45 (1): 5-32. doi:10.1023/A:1010933404324, respectively, the entirety of which are incorporated herein by reference. A typical unsupervised learning problem includes clustering, which requires dividing the data in several subgroups, each corresponding to a different subset with different characteristics.

At step 502, the method 500 reconstructs vehicle travelled routes based on the GPS traces. Step 502 determines the routes that have been traversed by the vehicle. In one embodiment, step 502 shows the routes on a map. Along the routes, any stops made by the vehicle are also determined and marked on the map. In an embodiment, for each vehicle, step 502 determines a plurality of states of the vehicle, which include states indicating whether the vehicle is in journey, idling, or halt. The state of in-journey shows that the vehicle is moving. The state of idling shows that the vehicle stands still with engine on. The state of halt shows that the vehicle stands still with engine off. The step 502 determines these states by analyzing the sequence of GPS traces of each vehicle, the information related to each GPS trace, the speed of the vehicle, and the engine events corresponding to the sequence of GPS traces. Engine events may be obtained based on the OBD codes transmitted from the vehicle to the fleet service provider. The states of vehicles, together with other information, are used to classify stops as work stops or non-work stops, which will be described later in detail.

Figure 6A:
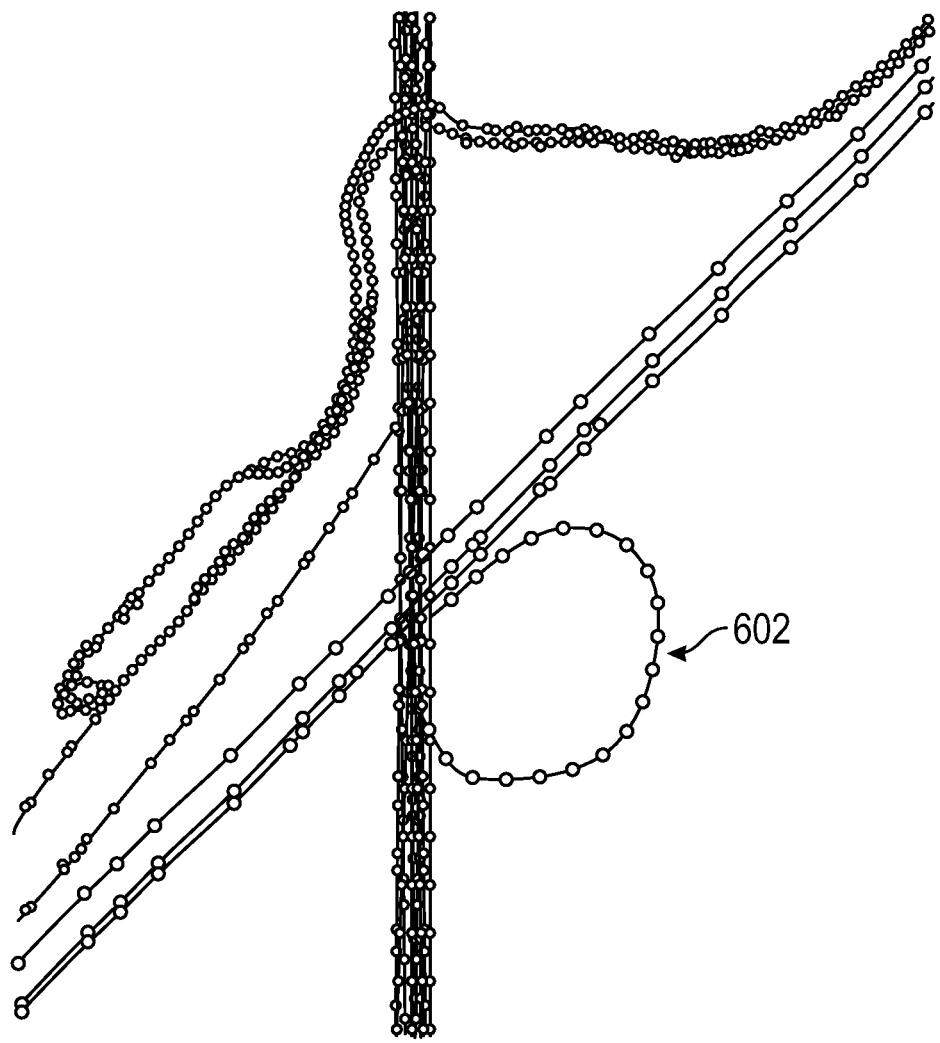
FIG. 6A illustrates GPS traces on a map according to an embodiment of the present application.

FIG. 6A illustrates a map showing raw GPS traces/tracks that have been retrieved directly from a database that merely stores these GPS/traces/tracks without any further processing. These raw GPS traces consist essentially of a sequence of position information, which is shown in FIG. 6A as a plurality of nodes 602 representing the data points having time stamp and position data. These data points may be stored at a regular interval or stored upon a request. For example, when a vehicle is moving, the data points may be sampled every second. When the vehicle is at a stop, the data points may be sample every minute. When these data points are connected by a plurality of links that sequentially connect the nodes 602, these raw GPS traces can reveal the general contour of a traveled route, such as a highway or an exit as shown in FIG. 6A. But when more meaningful information about the features associated with those nodes and links are required, these raw GPS traces need to be further analyzed by data mining algorithms. In the situation where a fleet service provider is interested in whether a stop represents a traffic jam, a lunch, home, or a delivery without any input from the fleet company, the fleet service provider may mine these data points to derive information relevant to the operation of the fleet. A fleet service provider is also interested in whether a stop occurs during on-duty or off-duty.

At step 504, the method 500 detects hotspots along the routes that have been travelled by the fleet. For a fleet, a hotspot, which represents a location that is associated with repeated or recurrent stops of vehicles, indicates important information about the fleet. For example, a hotspot may indicate the location of the administrative office of the fleet, a warehouse, a frequent customer's site, or a home of a vehicle's driver. Hotspots are determined based on the GPS traces and/or $3^{rd}$ party data. In one embodiment, a grid-based clustering algorithm is built in the geographical space, and all the stops that occurred in each cell of the grid are determined. A cell of the grid is considered as a hotspot if the total stop period of all vehicles in a fleet inside the cell is longer that a given threshold. The threshold may be determined based on the amount of hours that vehicles of a fleet are operated in a predetermined time period. As a hotspot includes an area, such as a parking lot, where vehicles of a fleet frequently visit, a hotspot may have a physical shape, rather than be just a single point. The shape of the hotspots may be refined for each grid cell such that the shape of a hotspot contains the stops within that cell. After the hotspots have been detected, a supervised machine learning algorithm is applied to classify hotspots into three types: depots, employee homes, or other locations. In one embodiment, a multi-class random forest algorithm has been applied, which has been trained on a dataset that has been labeled manually. For example, a model dataset may have the hotspots identified with the grid-based clustering algorithm over a month time for a subset of customers and is used to train the algorithm to make classifications of hotspots. The classification may be conducted based on a plurality of features, including the average number of stops per day, the percentage of fleet vehicles that stop at least once in the hotspot, the mean and standard deviation of stop durations, the maximum and minimum stop duration, the average cumulative stop duration per day, the percentage of overnight stops, the area and aspect ratio of the bounding box, the mean density of stops per day, the percentage of stops starting in specific time of the day (e.g., morning, afternoon, or night), and the percentage of stops ending in different time of the day (e.g., morning, afternoon or night).

At step 506, the method 500 determines work shifts of a vehicle of a fleet. A route planning is typically applied to the routes traversed by a fleet in one or a plurality of work shifts. The work shifts represent working hours of a vehicle, which may be, for example, a work day, several work days, or a week. In one embodiment, a statistical analysis of the historical GPS traces is used to identify, for each vehicle, the hour of the day when the vehicle activity is at a reduced level. For example, stops longer than a predetermined threshold, for example 3 hours, are first determined. Then, the inactivity of each hour of the day is determined by accumulating values based on the length of every stop occurred at that time. The hour with the highest score shows the time when the fleet is the least active. Then, a working day may be determined to be between two consecutive highest inactivity hours. In one embodiment, a working day starts from the first journey after a first highest inactivity hour and ends with the end of the last journey proceeding the second highest inactivity hour that is next to the first highest inactivity hour.

At step 508, the method 500 classifies stops into work stops and other stops. A work stop represents a location where the vehicle is required to stop by a work order. For example, a stop that occurs during a work shift and whose length falls within a predetermined interval may be deemed as a work stop. Other stops represent non-moving locations where vehicles make a stop at discretion. For example, non-moving situations due to refueling, lunch, or traffic congest are deemed non-work stop. In one embodiment, this classification is determined based on the spanning period of a stop. If a stop is longer than a given threshold, the stop is determined to be a work stop. In other embodiments, a machine learning algorithm that uses the information of third party databases, such as points of interests, may be used to classify these stops. For example, when a stop occurs at a location that represents a gas station, the stop may be classified as a fueling stop. When a stop occurs during a lunch time and at a fast food restaurant, the stop may be classified as a lunch stop.

As described in previous sections of the present application, the method 500 is capable of producing a wide range of additional data about the route pattern of vehicles of a fleet based on GPS traces. These additional data include working hours, depot, home locations, work stops, and traversed routes, which can be used by a fleet service provider in analyzing whether new routing software may produce a better optimized routes for that fleet. In this way, input from the owner of a fleet to test the new routing planning algorithm is not required. As the derived information is not limited to routing patterns, a fleet service provider can rely on the method 500 to derive other useful information relevant to a fleet and experiment new fleet management features with this derived useful information. The method 500 may be used by a fleet service provider to implement a solid analysis on the operation of a fleet and create detailed and convincing metrics showing improvements of the fleet operation. These analysis and metrics may be used as the basis to identify suitable fleets for a new fleet operation feature and to produce tailored marketing materials for a particular fleet.

Figure 6B:
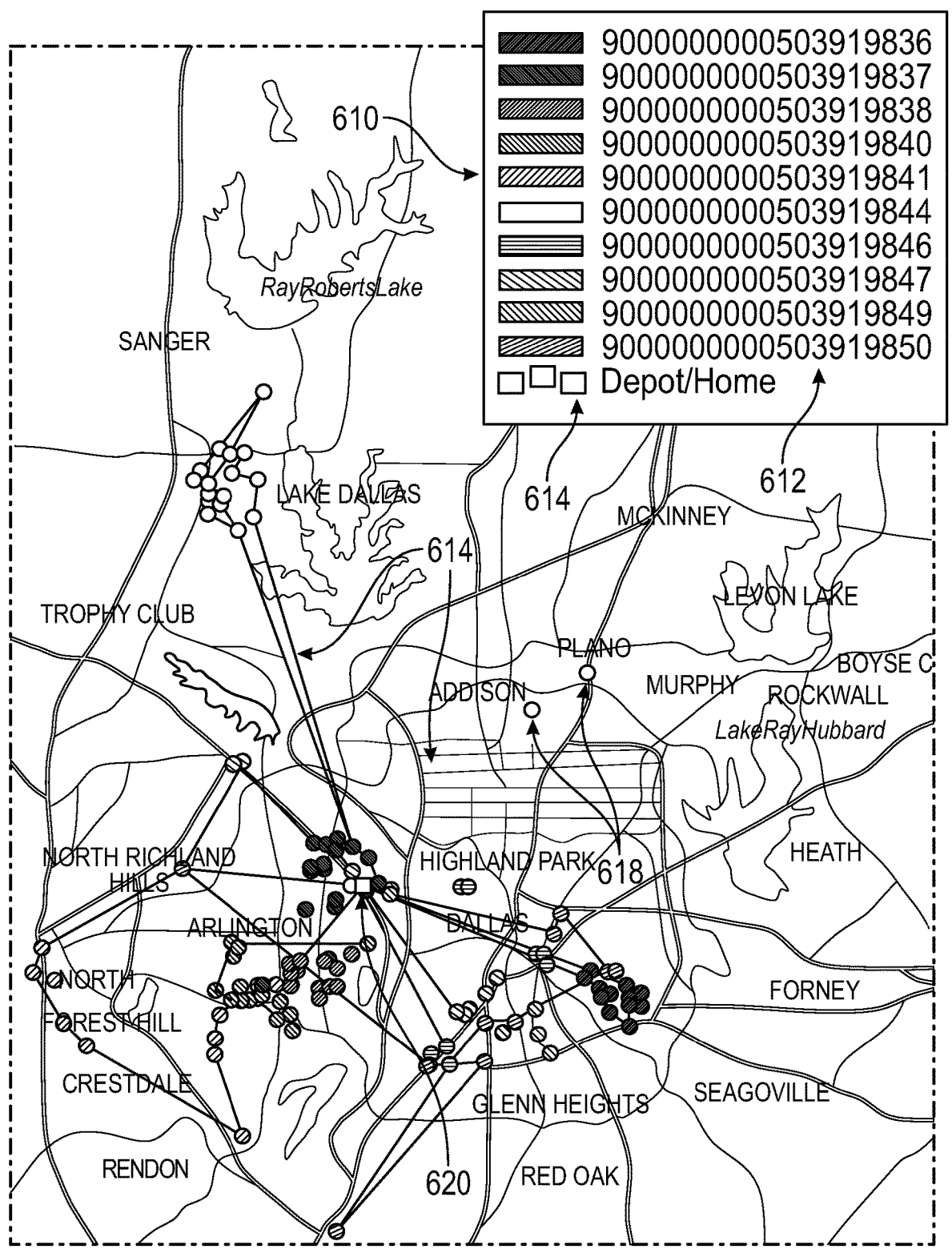
FIG. 6B illustrates reconstructed historical routes of a fleet according to an embodiment of the present application.

FIG. 6B illustrates a map with reconstructed routes, depots, and vehicles based on the GPS traces of a fleet according to an embodiment of the present application. The information box 610 shows the identification numbers 612 of each vehicle of the fleet. These identification numbers, such as 90000000000503919836, 90000000000503919837, . . . 90000000000503919850, may be obtained directly from GPS traces or may be the vehicle IDs stored in the fleet service provider's database or may be IDs reassigned by the present system or method. In the map of FIG. 6B, the fleet has 10 vehicles as shown by different colors. Other indicators, such as different symbols, may also be used to show and distinguish the 10 vehicles on the map. The information box 610 also uses indicators 614, such as a box, to show depots and homes. The plurality of routes 616 traveled by the vehicles are also shown on the map. Along each route, the plurality of stops 618 are also indicated by circles. In the example shown in FIG. 6B, only one depot 620 is determined and marked with a box. It is common for a small fleet of vehicles to have only one depot, which is their administrative office. All vehicles would start their day shift from the administrative office and end their day by the parking lot of the administrative office. Comparing with FIG. 6A, FIG. 6B shows much more information relevant to the operation of a fleet that is not directly provided in the GPS traces. It is also noted that the routes, stops, and depots shown in FIG. 6B are also associated with a plurality of other classifications that have been derived by the historical GPS traces but are not shown in FIG. 6B.

Figure 7:
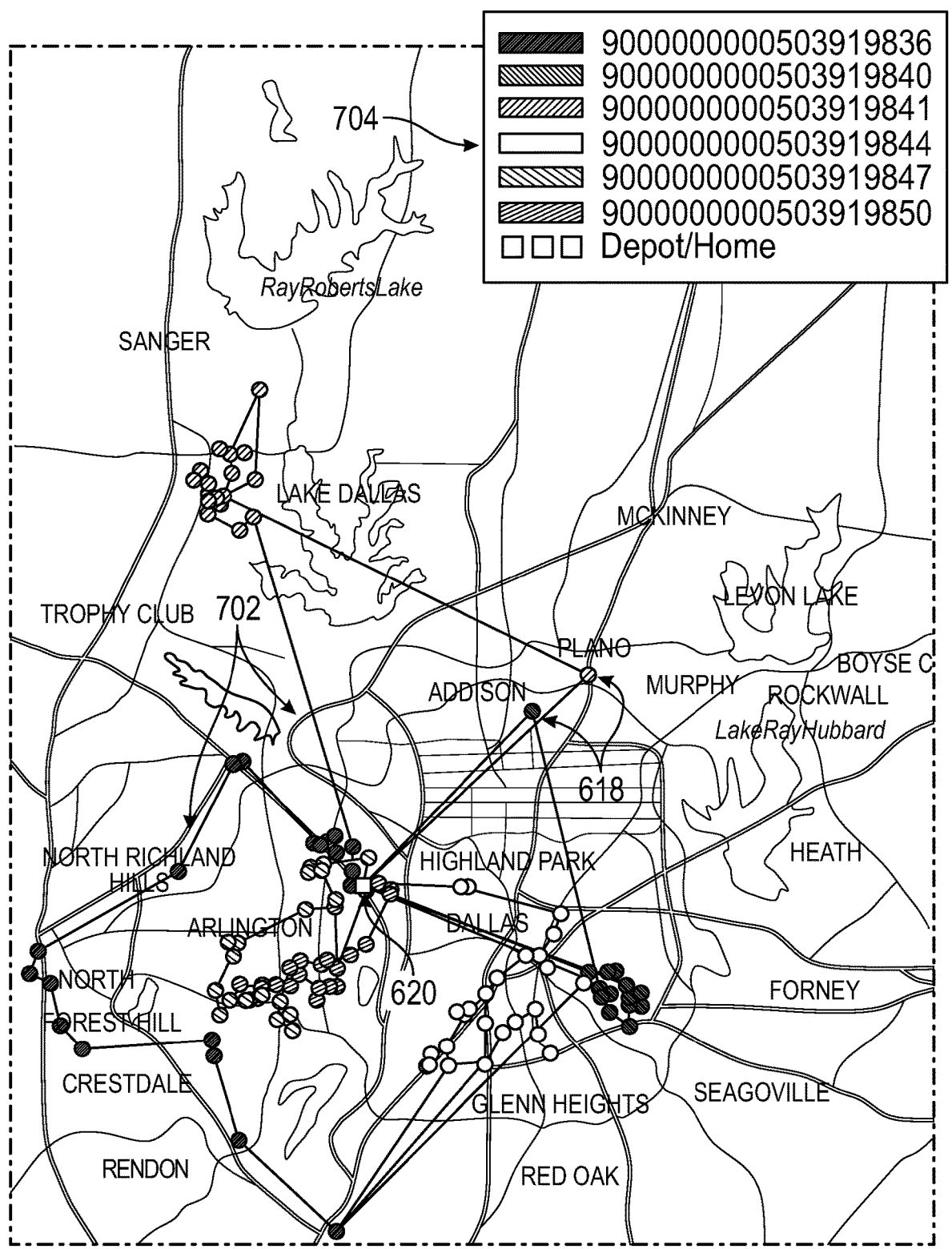
FIG. 7 illustrates re-planned historical routes of the fleet in FIG. 6B according to an embodiment of the present application.

FIG. 7 illustrates a map showing optimized routes by a new routing algorithm as applied to those routes in FIG. 6B according to an embodiment of the present application. Based on the temporal information of the GPS traces of the vehicles, the working hours have been firstly determined. Applying the routing functionalities to the fleet and work stops for the specified working hours, an optimized routing plan can be found. The new routing algorithm uses the same depot 620, but plans new routes 702 so that all work stops 618 are covered by the routes. In addition, the new routing algorithm reassigns vehicles to the routes. As shown in the information box 704, six vehicles are used to travel the routes to make the stops, which are four vehicles less than FIG. 6B. To the owner of the fleet, the new routing algorithm can use less vehicles than the actual operation to cover the same amount of stops, which reduces the number of drivers, the maintenance of vehicles, the total travel distance of the fleet, the toll paid by the fleet, and the fuel cost of the fleet.

Figure 8:
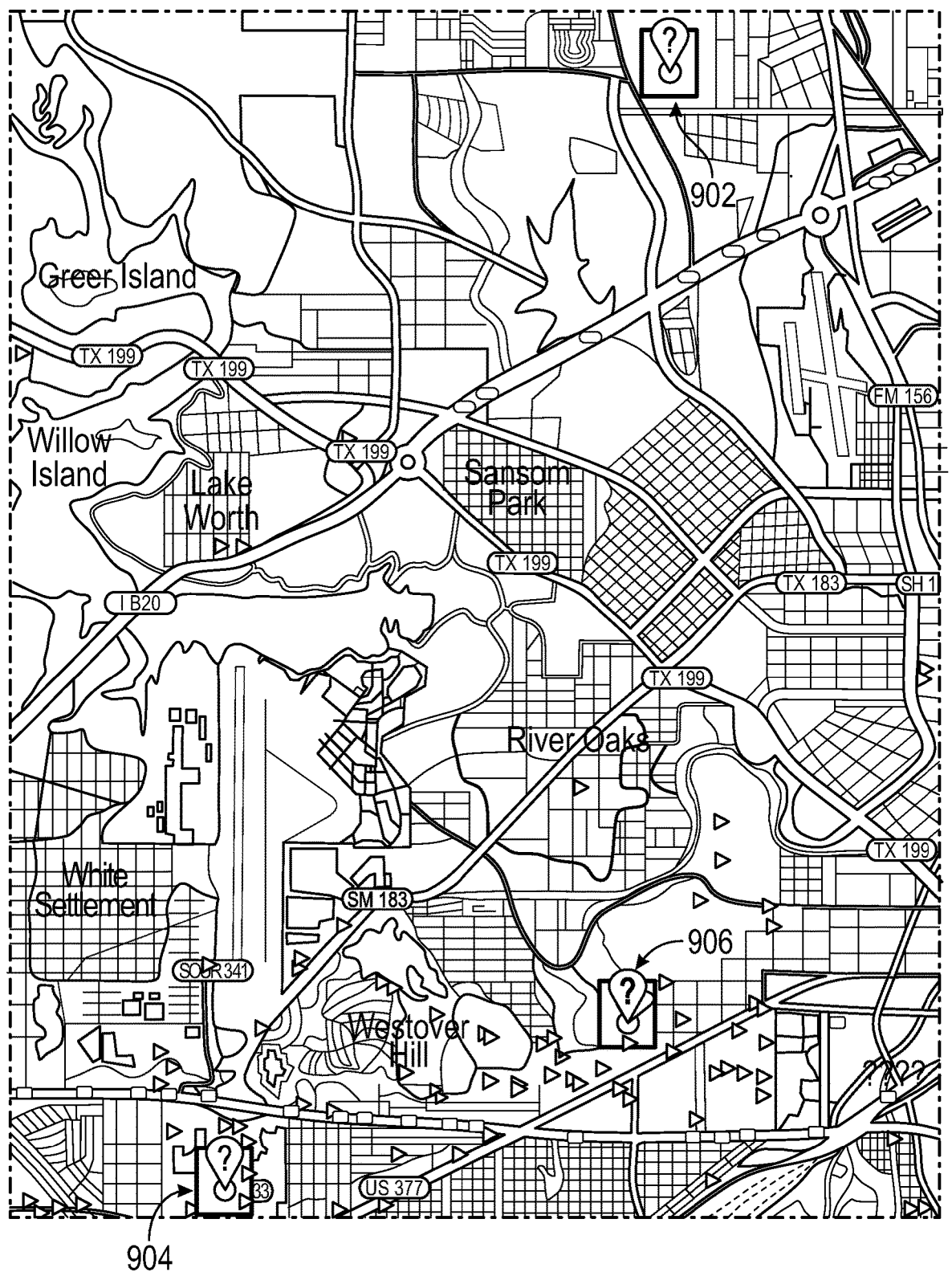
FIG. 8 illustrates a map showing a plurality of stops according to an embodiment of the present application.
Figure 9:
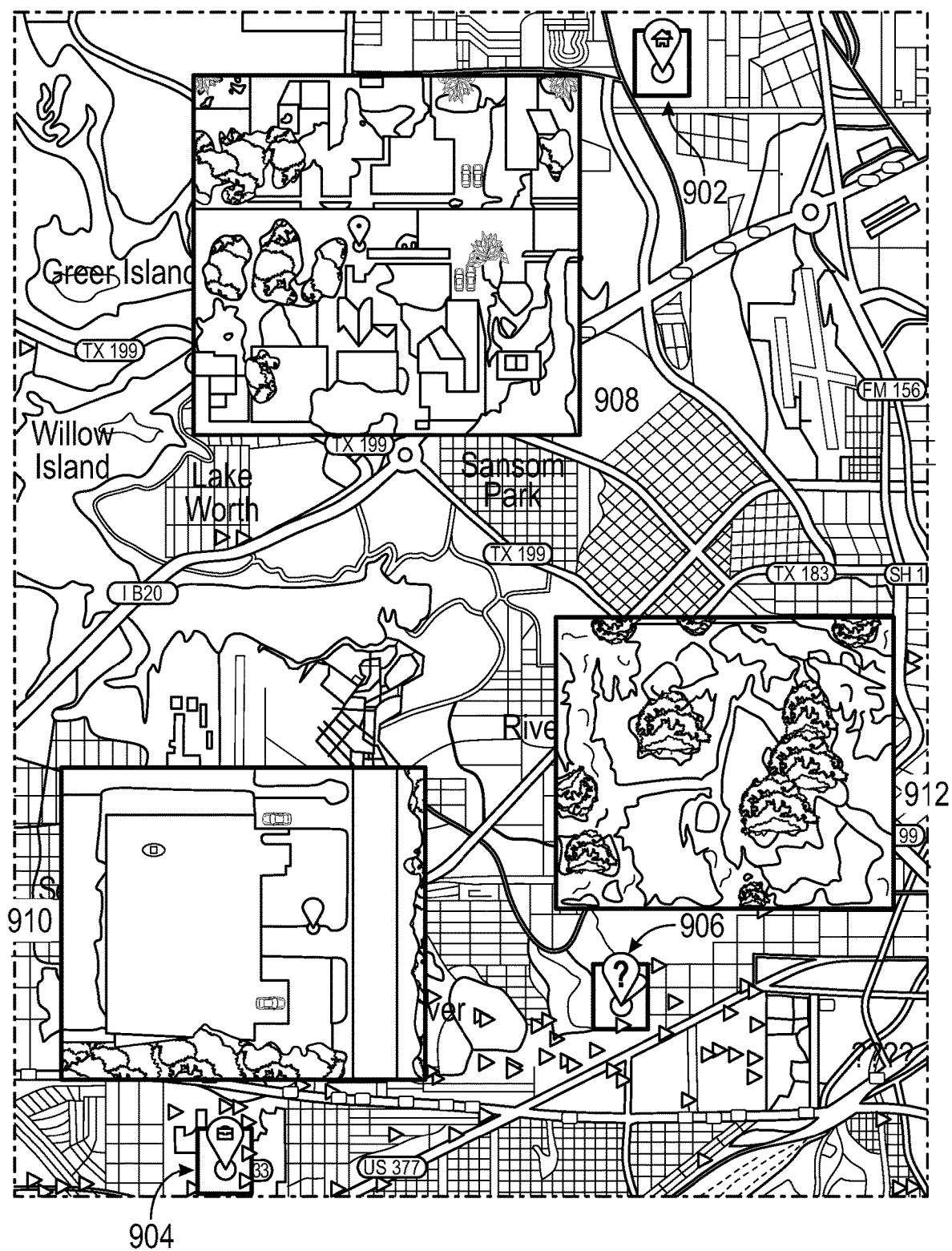
FIG. 9 illustrates a map showing the classification of stops in FIG. 8 according to an embodiment of the present application.

FIG. 8 illustrates a map having a plurality of stops according to an embodiment of the present application. The plurality of triangular boxes in FIG. 9 show all the stops determined by the method 500. The boxes 902, 904, and 906 illustrate the exemplary stops that need to be classified. To classify these stops, a machine learning classifier may take a set of features that describe a stop as input. An example of these features may include the duration, the time of the day of the stop, the percentage of day working hours covered at the time of the stop, and the use of points of interests queried from third-party resources. For instance, the method may check whether any other point of interests is within a predetermined distance from a stop. The point of interests may include fast-foods, fuel stations and restaurants. If no POIs are found in one stop while the other stop is close to a fast food restaurant, the algorithm may determine that the former stop is a work stop and the latter is a lunch stop. The method uses a plurality of features to classify a stop to enhance the accuracy and reliability of such a classification.

FIG. 9 shows a method of classifying stops 902, 904, and 906 in FIG. 9 according to an embodiment of the present application. Satellite images 908, 910, and 912 surrounding the stops are obtained for each stop, respectively, based on the coordinates of the stops and are used to determine whether the location is a work stop or other stops. These satellite images are obtained through $3^{rd}$ party data sources, such as Google. The location characteristics shown in the satellite images may be obtained from the meta data or descriptive information of these satellite images or may be determined by an image processing algorithm that is capable of identifying features in an image. For example, the satellite image 908 associated with the stop 902 shows a residential area, which suggests that the stop 902 may be a delivery stop or a home stop. Depending on the length of the stop, a more precise determination of the stop may be achieved. The satellite image 910 associated with the stop 904 shows a business complex or a warehouse, which suggests a work stop. In another embodiment, street-level images associated with stops may be obtained and used for classifying a stop.

As disclosed in the present application, the method and system of the present application perform automatic analysis, e.g. by means of machine learning algorithms, of historical GPS data stored by fleet management software for the identification of customers which may gain improvements on the fleet management by adopting a new routing algorithm. As shown in the examples, stored GPS traces of vehicles are analyzed together with any useful information from 3rd party's databases, such as Points Of Interests, to automatically detect customers which could benefit from the adoption of an intelligent routing software and to quantify return on investment of each customer as well as to produce personalized marketing material. GPS traces of the customers are analyzed by means of machine learning techniques, such as decision trees or random forests, to identify hotspots, such as depots and employees' homes, identify the duration of the shifts during the day, classify stops as work orders and any other information needed by the routing software. Routing software uses these data to identify the optimal service plan to serve all the work orders while minimizing the cost of the plan.

Actual and optimized routes are compared to estimate the potential return on investment (ROI) of routing products for each customer. ROI and other features such as number of work orders, number of vehicles, shape of routes, operations patterns, the company name and industry classification code, are used to train machine learning algorithms to identify the most promising leads in the customer base to adopt the routing feature. Optimized and actual routes are also used to produce maps and to compute statistics on mileage and costs to be included in a personalized marketing material and used in the sales conversation to persuade a customer. The present system and method is suitable to be implemented via parallel computing solutions to easily scale vertically and horizontally the resources used to perform the computation when the size of the potential customer base increases.

In a hypothetical example, the system and method as set forth in the present application are used to analyze the operation of ABC Inc., which has a fleet of nine vehicles that is used to make daily parcel deliveries. The system and method have historical GPS traces that represent the actual traveled routes by the nine vehicles, whose route planning is done by an existing routing algorithm. On one typical day, the nine vehicles would need to make about 172 deliveries that require the fleet to work about 73.6 hours and travel about 1,339.5 miles. Unknown to the ABC Inc., new routing software has been developed, which would improve the operation of a fleet like ABC Inc. The system and method as set forth in the present application can derive the daily operation information of the fleet by mining the GPS traces of the fleet of ABC Inc. and then apply the new routing algorithm to optimize the daily routes of ABC Inc. The routes planned by the new routing algorithm require only six vehicles to make the 172 deliveries. The vehicles in total travel about 190 miles less and work about 1 hour shorter than those of the old routing algorithm. These analytical analysis and results provide a concrete basis for ABC Inc. to determine whether to adopt the new routing algorithm. To assist the decision making process of ABC Inc., these analysis and example are included in a personalized marketing material or brochure for ABC Inc. The marketing brochure may additionally include maps showing the actual routes traveled by the fleet and newly planned routes produced by the new routing algorithm. To demonstrate the reliability of the analysis, the marketing brochure may further include specific fleet operation information, such as a particular day, the working hours, and the specific vehicles used by the analysis and the dollar amount that could be saved by the new routing algorithm.

The present system and method may be used for identifying improvements on many fleet operation characteristics. In one example, a new routing algorithm may solve the problem of dispatching a set of work orders among a given set of vehicles and finding the optimal solution in terms of a given cost function. The cost function could be related either to the distance traveled, to the cost of the solution, to the time required, or any combination of them. In addition to the assignment of work orders to vehicles, the routing software decides the order with which the work orders have to be served and the route each single vehicle has to cover. The decision regarding the assignment of work orders to vehicles and their order could be constrained by time windows to serve each work orders, capacity limits of the vehicles or demands at the work orders, working hours of the drivers, skills of drivers and/or vehicles.

In another example, field service management products may help in the management of company resources deployed at client's properties rather than at the company properties. Their functionalities encompass dispatching and scheduling of jobs, real time communication functionalities between managers and field workers, inventory management, billing and back office facilities and digitalization. In yet another example, fleet management add-ons, like preventive maintenance features, enable the user to schedule maintenance remainders and setup automatic alerts to fire when trucks are due for service.

The phrase "an embodiment" as used herein does not necessarily refer to the same embodiment, though it may. In addition, the meaning of "a," "an," and "the" comprise plural references; thus, for example, "an embodiment" is not limited to a single embodiment but refers to one or more embodiments. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like.

While this invention has been described in conjunction with the specific embodiments outlined above, it is evident that many alternatives, modifications, and variations will be apparent to those ordinarily skilled in the art. Accordingly, the preferred embodiments of the invention as set forth above are intended to be illustrative, not limiting. Various changes may be made without departing from the spirit and scope of the inventions as defined in the following claims.

What is claimed is:

1. A method for optimizing traveled routes of a fleet, the method comprising:
   reconstructing routes traveled by vehicles of the fleet based on historical GPS traces of the fleet;
   determining stops made by the vehicles along the travelled routes;
   determining a work shift of a fleet by:
      using statistical analysis of the historical GPS traces to determine a first time when vehicle activity is at a first level,
      using statistical analysis of the historical GPS traces to determine a second time when the vehicle activity is at second level, and
      determining the work shift using the first time and the second time;
   classifying the stops into work stops and non-work stops;
   optimizing routes for covering the work stops,
      wherein information associated with the optimized routes is used to redistribute one or more vehicles, of the vehicles, to minimize a quantity of vehicles used to cover the work stops based on the work shift; and
   providing the information associated with the optimized routes to at least one of:
      selected vehicles of the fleet, or
      an identified fleet with similar characteristics to the fleet.

2. The method of claim 1, further comprising:
   determining hotspots from the stops, a hotspot, of the hotspots, representing a recurrent stop made by vehicles of the fleet.

3. The method of claim 2, further comprising:
   determining depots from the hotspots, a depot, of the depots, representing an administrative office or a warehouse of the fleet.

4. The method of claim 3, further comprising:
   determining work hours of the fleet based on the historical GPS traces.

5. The method of claim 1, further comprising:
   obtaining point-of-interests information from a $3^{rd}$ party database; and
   classifying a stop based on the historical GPS traces and the point-of-interests information.

6. The method of claim 1, further comprising:
   determining whether the fleet is benefited from adopting a fleet management function based on the optimized routes.

7. The method of claim 6, further comprising:
   selecting a plurality of fleets that will be benefited from adopting the fleet management function; and
   preparing individualized market materials that include results obtained by determining whether the fleet is benefited from adopting the fleet management function.

8. The method of claim 6, wherein the fleet management function is a routing algorithm.

9. The method of claim 8, further comprising:
   determining a return of investment for the fleet that is generated by an adoption of the routing algorithm, the return of investment being determined based on the optimized routes.

10. A non-transitory computer-readable medium storing instructions, the instructions comprising:
   one or more instructions that, when executed by one or more processors of a device, cause the one or more processors to:
      reconstruct routes traveled by vehicles of a fleet based on historical GPS traces of the fleet;
      determine a work shift of a fleet,
         wherein the one or more instructions, that cause the one or more processors to determine the work shift, cause the one or more processors to:
            use statistical analysis of the historical GPS traces to determine a first time when vehicle activity is at a first level,
            use statistical analysis of the historical GPS traces to determine a second time when the vehicle activity is at a second level, and
            determine the work shift using the first time and the second time;
      determine stops made by the vehicles along the travelled routes;
      classify the stops into work stops and non-work stops;
      optimize routes for the work stops,
         wherein information associated with the optimized routes redistribute one or more vehicles, of the vehicles, to minimize a quantity of vehicles used to cover the work stops based on the work shift; and provide the information associated with the optimized routes to at least one of:
selected vehicles of the fleet, or
an identified fleet with similar characteristics to the fleet.

11. The non-transitory computer-readable medium of claim 10, wherein the one or more instructions, when executed by the one or more processors, further cause the one or more processors to:
determine hotspots from the stops, a hotspot, of the hotspots, representing a recurrent stop made by vehicles of the fleet.

12. The non-transitory computer-readable medium of claim 11, wherein the one or more instructions, when executed by the one or more processors, further cause the one or more processors to:
determine depots from the hotspots, a depot, of the depots, representing an administrative office or a warehouse of the fleet.

13. The non-transitory computer-readable medium of claim 12, wherein the one or more instructions, when executed by the one or more processors, further cause the one or more processors to:
determine work hours of the fleet based on the historical GPS traces.

14. The non-transitory computer-readable medium of claim 10, wherein the one or more instructions, when executed by the one or more processors, further cause the one or more processors to:
classify point-of-interests information from a $3^{rd}$ party database; and
classify a stop based on the historical GPS traces and the point-of-interests information.

15. The non-transitory computer-readable medium of claim 10, wherein the one or more instructions, when executed by the one or more processors, further cause the one or more processors to:
determine whether the fleet is benefited from adopting a fleet management function.

16. The non-transitory computer-readable medium of claim 15, wherein the one or more instructions, when executed by the one or more processors, further cause the one or more processors to:
select a plurality of fleets that will be benefited from adopting the fleet management function; and
prepare individualized market materials that include results obtained by determining whether the fleet is benefited from adopting the fleet management function.

17. The non-transitory computer-readable medium of claim 15, wherein the fleet management function is a routing algorithm.

18. The non-transitory computer-readable storage medium of claim 17, wherein the one or more instructions, when executed by the one or more processors, further cause the one or more processors to:
determine a return of investment for the fleet that is generated by an adoption of the routing algorithm, the return of investment being determined based on the optimized routes.

19. A device comprising:
one or more memories; and
one or more processors to:
reconstruct routes traveled by vehicles of a fleet based on historical GPS traces of the fleet;
determine a work shift of a fleet, wherein the one or more processors, when determining the work shift, are to:
use statistical analysis of the historical GPS traces to determine a first time when vehicle activity is at a first level,
use statistical analysis of the historical GPS traces to determine a second time when the vehicle activity is at a second level, and
determine the work shift using the first time and the second time;
determine stops made by the vehicles along the travelled routes;
classify the stops into work stops and non-work stops;
optimize routes for the work stops,
wherein information associated with the optimized routes redistribute one or more vehicles, of the vehicles, to minimize a quantity of vehicles used to cover the work stops based on the work shift; and
provide the information associated with the optimized routes to at least one of:
selected vehicles of the fleet, or
an identified fleet with similar characteristics to the fleet.

20. The device of claim 19, wherein the one or more processors are further configured to at least one of:
determine hotspots from the stops, a hotspot, of the hotspots, representing a recurrent stop made by vehicles of the fleet, or
determine depots from the hotspots, a depot, of the depots, representing an administrative office or a warehouse of the fleet.

* * * * *